United States Patent Office 2,976,110
Patented Mar. 21, 1961

2,976,110
PROCESS FOR PRINTING WITH VAT DYESTUFFS

Felix Gund and Friedrich Schubert, Leverkusen, and Dieter Goerrig, Lohmar, Germany; said Gund and said Schubert assignors to said Goerrig No Drawing. Filed Apr. 8, 1958, Ser. No. 727,063

Claims priority, application Germany Apr. 16, 1957

3 Claims. (Cl. 8—70)

This invention relates to a printing process with vat dyestuffs. The printing with vat dyestuffs is carried out by drying the webs of fabrics printed with suitable dyestuff pastes and subsequently subjecting them to a heat treatment such as a steaming process. The reducing power of the reducing agent contained in the dyestuff pastes should not, as far as possible, be changed in the drying process, but the dyestuff, on the other hand, should not yet be vatted in the drying process, but developed only in the subsequent heat treatment (steaming process).

It is an object of the present invention to provide a novel reducing agent for the printing process with vat dyestuffs. A further object is to provide a reducing agent which is stable at lower temperatures than the printing temperature. Further objects will appear hereinafter.

It has now been found that boranates are very useful as reducing agents in the printing pastes of vat dyestuffs. Suitable boranates are, for example, the alkali metal or alkaline earth metal boranates such as sodium boranate or potassium boranate.

The printing according to the process of the invention can be carried out in conventional manner by first producing a usual printing paste which contains a boranate as reducing agent, however, instead of the rongalite commonly used up to the present, printing this paste on the material to be dyed, then effecting an intermediate drying at temperatures up to about 95° C. and subsequently developing the dyestuff by steaming. The prints thus obtained are then subjected to the conventional after-treatments.

The boranates used according to the invention possess a good stability in the intermediate drying process, but vat the vat dyestuffs nearly instantaneously in the heat treatment at temperatures of about 100° C. An especial advantage of the boranates consists in that a boranate molecule has a reducing power 4 times greater than 1 molecule of rongalite commonly employed. Furthermore, the alkali metal boranates have a substantially smaller molecular weight than rongalite so that in comparison with rongalite essentially smaller quantities of boranates have to be employed. The boranates should be used in amounts of at least 2% referred to the vat dyestuffs, but it can be of advantage to use higher amounts e.g. 10–50%.

It is especially surprising that the new process can be carried out in the manner described since the vat dyestuffs cannot be reduced, or only insufficiently in an aqueous alkaline solution, even if high concentrations and higher temperatures are used.

The following examples are given for the purpose of illustrating the invention.

Example 1

A cotton fabric is printed with a printing paste, the preparation of which will be described below, on a cylinder printing machine. After printing, the fabric is dried and steamed at about 102° C. for 5–10 minutes in a rapid ager. After steaming, the material is rinsed, oxidised at 50° C. for about 2–3 minutes with a solution of 5 millilitres per litre of hydrogen peroxide (30%) and 2 millilitres per litre of acetic acid (30%), rinsed again and finally soaped at boiling temperature.

Preparation of the printing paste: 60 grams of potassium carbonate are dissolved in a little water and the solution is treated with 35 grams of sodium hydroxide solution (32.5%). 20 grams of potassium boranate of the formula $KBH_4$ are dissolved in the requisite quantity of water and the solution is united with the solution of potassium carbonate and sodium hydroxide solution. This mixture of the solutions is then stirred into 400–500 grams of a thickening prepared in usual manner of wheat starch and tragacanth, which may previously be neutralised or rendered weakly alkaline by the addition of small quantities of sodium hydroxide solution. 75 grams of a commercial aqueous paste of the dyestuff Flavanthrene, (containing 20 parts or pure Flavanthrene in 100 parts) are then stirred into it and the printing paste is then made up to 1 kilogram with water.

Example 2

A cotton fabric is printed with a printing paste the composition of which is indicated below, and the process is otherwise carried out as described in Example 1. A full green shade is thus obtained.

Preparation of the printing paste: 60 grams of potassium carbonate, 35 grams of sodium hydroxide solution (32.5%) and 20 grams of potassium boranate are dissolved as described in Example 1 and stirred into the thickening of wheat starch and tragacanth. 100 grams of a commercial aqueous paste of the dyestuff dimethoxy-dibenzanthrone (obtained from dibenzanthrone by oxidation to give dihydroxy-dibenzanthrone and subsequent methylation) containing 23 percent of dyestuff, are then added and the mixture is made up with water to 1 kilogram.

Example 3

A cotton fabric is printed with a printing paste the composition of which is indicated below, and the process is otherwise carried out as described in Example 1. A full red shade is thus obtained.

Preparation of the printing paste: 60 grams of potassium carbonate, 35 grams of sodium hydroxide solution (32.5%) and 20 grams of potassium boranate are dissolved as described in Example 1 and stirred into a thickening of wheat starch and tragacanth; 10 grams of 2,5-di-[1-aminoanthraquinonyl-(2)]-1,3,4-oxidiazole are added and the weight of the mixture is made up to 1 kilogram with water.

Example 4

A cotton fabric is printed with a printing paste the composition of which is indicated below, and the process is otherwise carried out as described in Example 1. A full violet shade is thus obtained.

Preparation of the printing paste: 60 grams of potassium carbonate, 35 grams of sodium hydroxide (32.5%) and 20 grams of potassium boranate are dissolved as in Example 1 and the solution is stirred into the thickening of wheat starch and tragacanth. 20 grams of Indanthrene Brilliant Violet RR (cf. Schultz, Farbstofftabellen, 7th edition (1931), vol. 1, No. 1265) are then added and the mixture is made up to 1 kilogram with water.

*Example 5*

Preparation of a stock thickening: 65 grams of tragacanth are swelled up in 1 liter of luke warm water for 24 hours. In separate batch 100 g. of wheat starch are boiled in 1 liter of water. The resulting thickening of tragacanth and starch is mixed in the ratio 5:1, heated up once more to 70° C., thoroughly stirred and filtered after cooling.

The starch thickener thus obtained is used for printing in the following manner: 30 grams of a vat dyestuff, the composition of which is indicated below, 35 grams of sodium hydroxide solution (38° Bé.), 60 grams of potassium carbonate, 30 grams of glycerol, 15 grams of sodium boranate and 600 grams of the above stock thickening are mixed with 230 grams of water. Fabrics of cotton, staple fiber and rayon are printed with this printing paste by machine printing or screen printing, dried at 40–70° C. and then steamed in the Mather & Platt ager or star steamer with wet steam at 102–104° C. for 7 minutes.

The prints are after-treated with 2 ml. per liter of acetic acid (30%) and 5 ml. per liter of hydrogen peroxide (30%) in 40–60° C. hot water for 5 minutes, subsequently soaped at boiling temperature, rinsed and dried.

For instance the following vat dyestuffs may be used:

Indanthrene Yellow 5GK (Schultz, "Farbstofftabellen," 7th edition, vol. 2, p. 129)
Indanthrene Printing Yellow GOK (Schultz, "Farbstofftabellen," 7th edition, suppl. vol. 1 (1934) p. 105)
Indanthrene Brilliant Orange GK (Schultz, "Farbstofftabellen," 7th edition, vol. 2, p. 128)
Indanthrene Orange RRT (Schultz, "Farbstofftabellen," 7th edition, vol. 2, p. 131)
Indanthrene Scarlet B (Schultz, "Farbstofftabellen," 7th edition, vol. 2, p. 132)
Indanthrene Scarlet GG (Schultz, "Farbstofftabellen," 7th edition, vol. 2, p. 132)
Indanthrene Brilliant Pink R (Schultz, "Farbstofftabellen," 7th edition, vol. 1, No. 1345)
Indanthrene Red FBB (Schultz, "Farbstofftabellen," 7th edition, vol. 2, p. 131)
Indanthrene Brilliant Indigo 4B (Schultz, "Farbstofftabellen," 7th edition, vol. 1, No. 1314)
Indanthrene Blue-Green FFB (Schultz, "Farbstofftabellen," 7th edition, vol. 2, p. 127)
Indanthrene Brilliant Green GG (Schultz, "Farbstofftabellen," 7th edition, vol. 1, No. 1269)
Indanthrene Olive Green B (Schultz, Farbstofftabellen," 7th edition, vol. 2, p. 131)
Indanthrene Printing Brown R (Schultz, "Farbstofftabellen," 7th edition, vol. 2, p. 129)
Indanthrene Printing Brown 3R (Schultz, "Farbstofftabellen," 7th edition, vol. 2, p. 129)
Indanthrene Printing Brown 5R (Schultz, "Farbstofftabellen," 7th edition, suppl. vol. 1 (1934), p. 107)
Indanthrene Printing Brown B (Schultz, "Farbstofftabellen," 7th edition, suppl. vol. 1 (1934), p. 107)
Indanthrene Gray M (Schultz, "Farbstofftabellen," 7th edition, vol. 2, p. 130)
Indanthrene Gray 3B (Schultz, "Farbstofftabellen," 7th edition, suppl. vol. 1 (1934), p. 106)

*Example 6*

Tragacanth (80 g. per liter of water) is swelled up for 24 hours and then boiled for 3–4 hours. In addition, wheat starch thickening (200 grams per liter of water) is prepared by boiling. The tragacanth starch thickener is mixed in the ratio 1:3, boiled up once more and filtered after cooling.

This stock thickening is used for printing as follows: 75 grams of one of the vat dyestuffs indicated below, 35 grams of sodium hydroxide solution (38° Bé.), 60 grams of potassium carbonate, 20 grams of potassium boranate or sodium boranate, 600 grams of the stock thickening and 210 grams of water are mixed with each other. Printing and after-treatment are carried out as described in Example 5.

The following vat dyestuffs may for instance be used:

Indanthrene Yellow G (Schultz, "Farbstofftabellen," 7th edition, vol. 1, No. 1241)
Indanthrene Gold Yellow RK (Schultz, "Farbstofftabellen," 7th edition, vol. 2, p. 130)
Indanthrene Brilliant Orange GR (Schultz, "Farbstofftabellen, 7th edition, vol. 2, p. 128)
Indanthrene Brilliant Orange RK (Schultz, "Farbstofftabellen," 7th edition, vol. 2, p. 128)
Indanthrene Brilliant Violet RR (Schultz, "Farbstofftabellen," 7th edition, vol. 1, No. 1265)
Indanthrene Dark Blue BOA (Schultz, "Farbstofftabellen," 7th edition, vol. 1, No. 1262)
Indanthrene Brilliant Green B (Schultz, "Farbstofftabellen," 7th edition, vol. 1, No. 1269)
Indanthrene Brown RRD (Schultz, "Farbstofftabellen," 7th edition, vol. 2, p. 127)
Indanthrene Printing Black BL (Schultz, "Farbstofftabellen," 7th edition, vol. 2, p. 128)

*Example 7*

The thickenings indicated in Examples 5 and 6 may be used for producing a color discharge for instance on a 1% dyeing of a red cotton dyestuff in the following manner:

Color discharge:

700 grams thickening
35 grams of sodium hydroxide solution
60 grams of potassium carbonate
30 grams of glycerol
30 grams of sodium boranate
30 grams of one of the vat dyestuffs indicated in Example 5

Printing, drying and steaming are carried out as described in Example 5. After-treating is likewise carried out as described in Example 5, however, without soaping at boiling temperature.

Two-phase printing: By the Colloresin-process prints are produced as follows:

Printing paste: 600 grams of locust bean flower-wheat starch (7:3) are mixed with 30 grams of one of the vat dyestuffs indicated in Example 5, and 370 grams of water.

The printed and dried fabrics are treated in the Monfort reactor with the following cold padding liquor:

15 grams of sodium boranate
40 grams of sodium hydroxide solution (38° Bé.)
15 grams of borax
30 grams of a dispersion agent
50 grams of Glauber's salt under the following reaction conditions:

Squeezing effect, 100%
Contact duration, 45 seconds
Contact temperature at a temperature of 135° C. of the cylinder, wherein pre-heating is effected, and 120° C. of the main cylinder.

The prints are developed, soaped at boiling temperature and rinsed as described in Example 5.

We claim:
1. In the process for the printing with vat dyestuffs, the improvement which comprises printing with a paste composition containing boronates as reducing agents.

2. In the process for the printing with vat dyestuffs, the improvement which comprises printing with a paste composition containing sodium boronate as reducing agents.

3. In the process for the printing with vat dyestuffs, the improvement which comprises printing with a paste composition containing potassium boronate as reducing agents.

References Cited in the file of this patent

UNITED STATES PATENTS 2,745,788 Frohnsdorff _____ May 15, 1956

FOREIGN PATENTS 367,240 Great Britain _____ Feb. 18, 1932

OTHER REFERENCES

Gaylord: Reduction With Complex Metal Hydrides, Intersci. Pub., Inc., N.Y., 1956, pp. 100–102.